United States Patent
Rilling

[11] 4,052,761
[45] Oct. 11, 1977

[54] CARTOP TRUNK BOAT

[76] Inventor: Charles A. Rilling, 191 Carman Hill Road No. 2, New Millford, Conn. 06776

[21] Appl. No.: 702,945

[22] Filed: July 6, 1976

[51] Int. Cl.² .............................................. B63B 7/04
[52] U.S. Cl. .............................................. 9/2 S
[58] Field of Search .................. 9/1.1, 2 R, 2 S, 2 C, 9/2 F, 6 P

[56] References Cited

U.S. PATENT DOCUMENTS

| | | | |
|---|---|---|---|
| 624,375 | 5/1899 | Osmond | 9/2 F |
| 2,212,088 | 8/1940 | Tomassi | 9/2 S |
| 2,292,972 | 8/1942 | Rice | 9/2 S |
| 2,650,376 | 9/1953 | Sommer | 9/2 S |
| 2,659,464 | 11/1953 | Sweetman | 9/2 F |
| 2,815,309 | 12/1957 | De Ganahl et al. | 9/6 P |
| 3,266,067 | 8/1966 | Windle | 9/2 S |
| 3,684,139 | 8/1972 | Johnson | 9/2 F |

FOREIGN PATENT DOCUMENTS

| | | | |
|---|---|---|---|
| 40,439 | 9/1967 | Germany | 9/2 F |

*Primary Examiner* — Trygve M. Blix
*Assistant Examiner* — Stuart M. Goldstein
*Attorney, Agent, or Firm* — Richard L. Miller

[57] ABSTRACT

A cartop, weather-tight, utility luggage carrier or trunk, which by adding two additional sections that are all detachably secured together therewith thus form a boat, the luggage carrier and sections when detached being able to nest inside each other so as to compactly fit upon a car roof rack.

2 Claims, 11 Drawing Figures

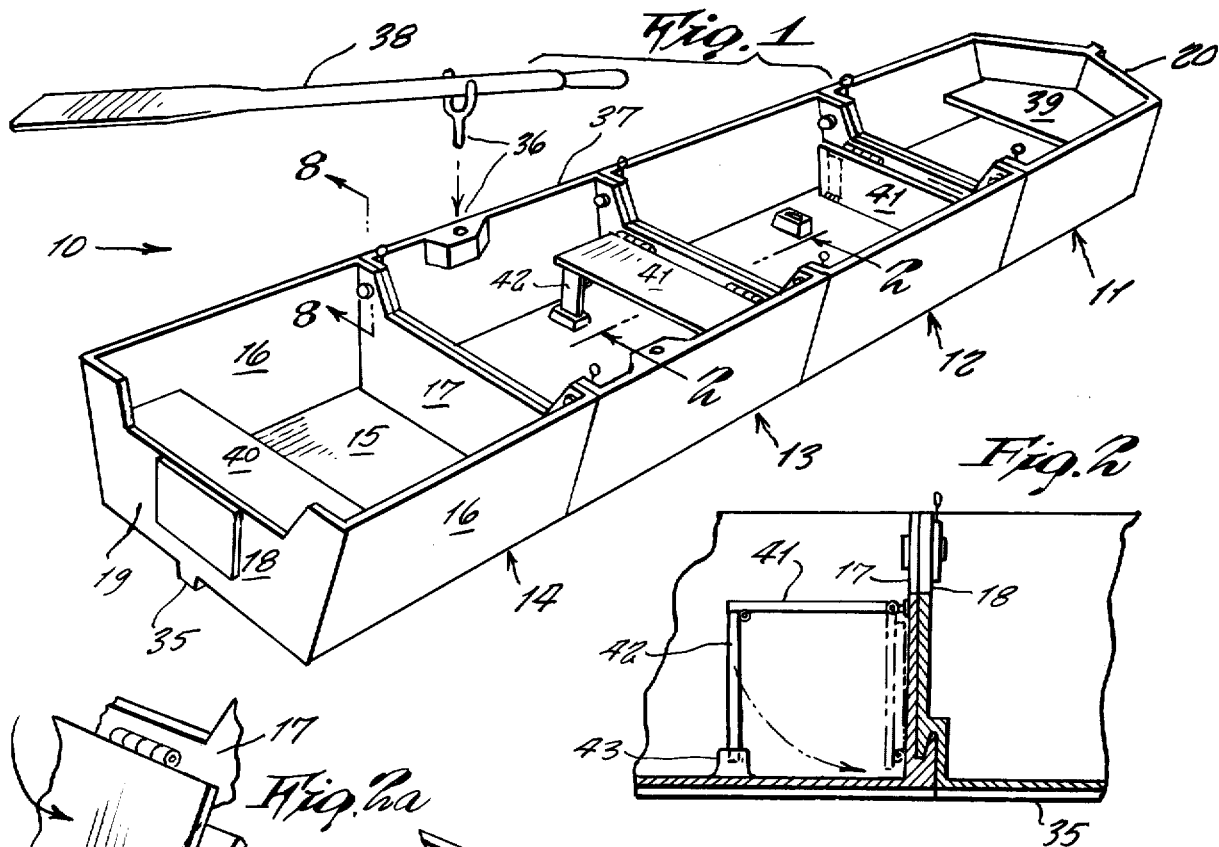
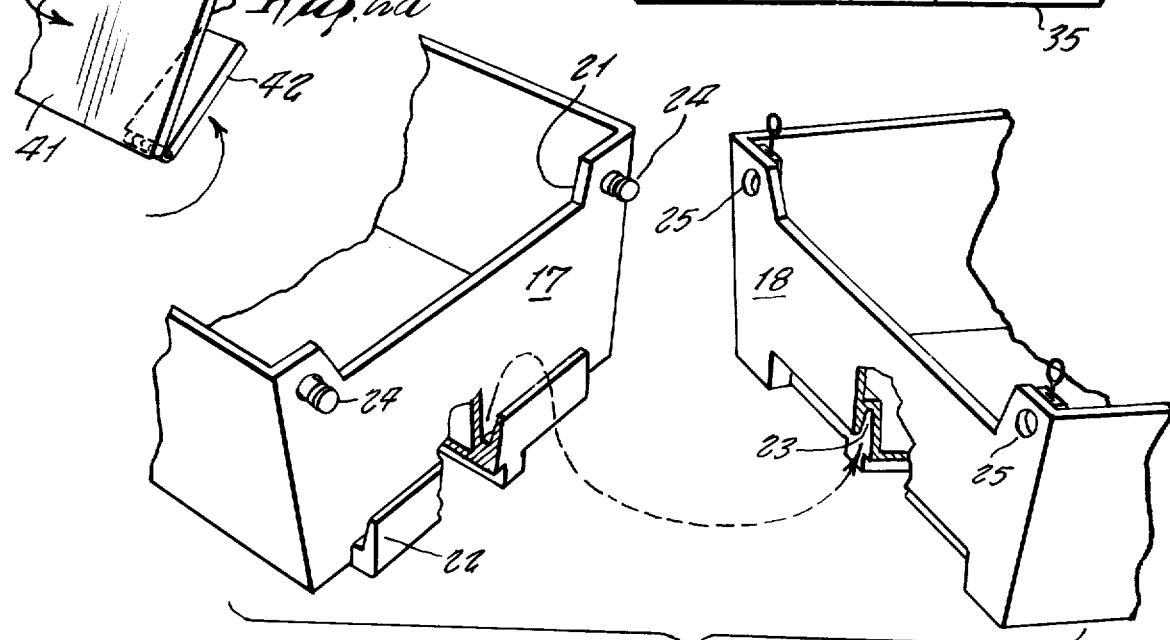
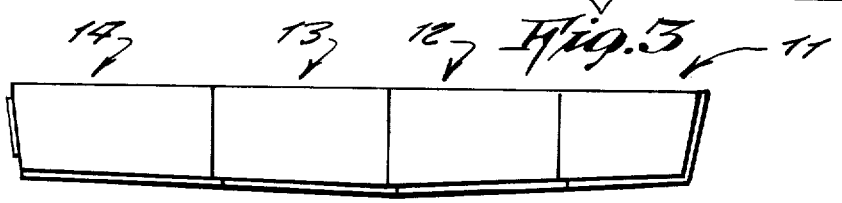

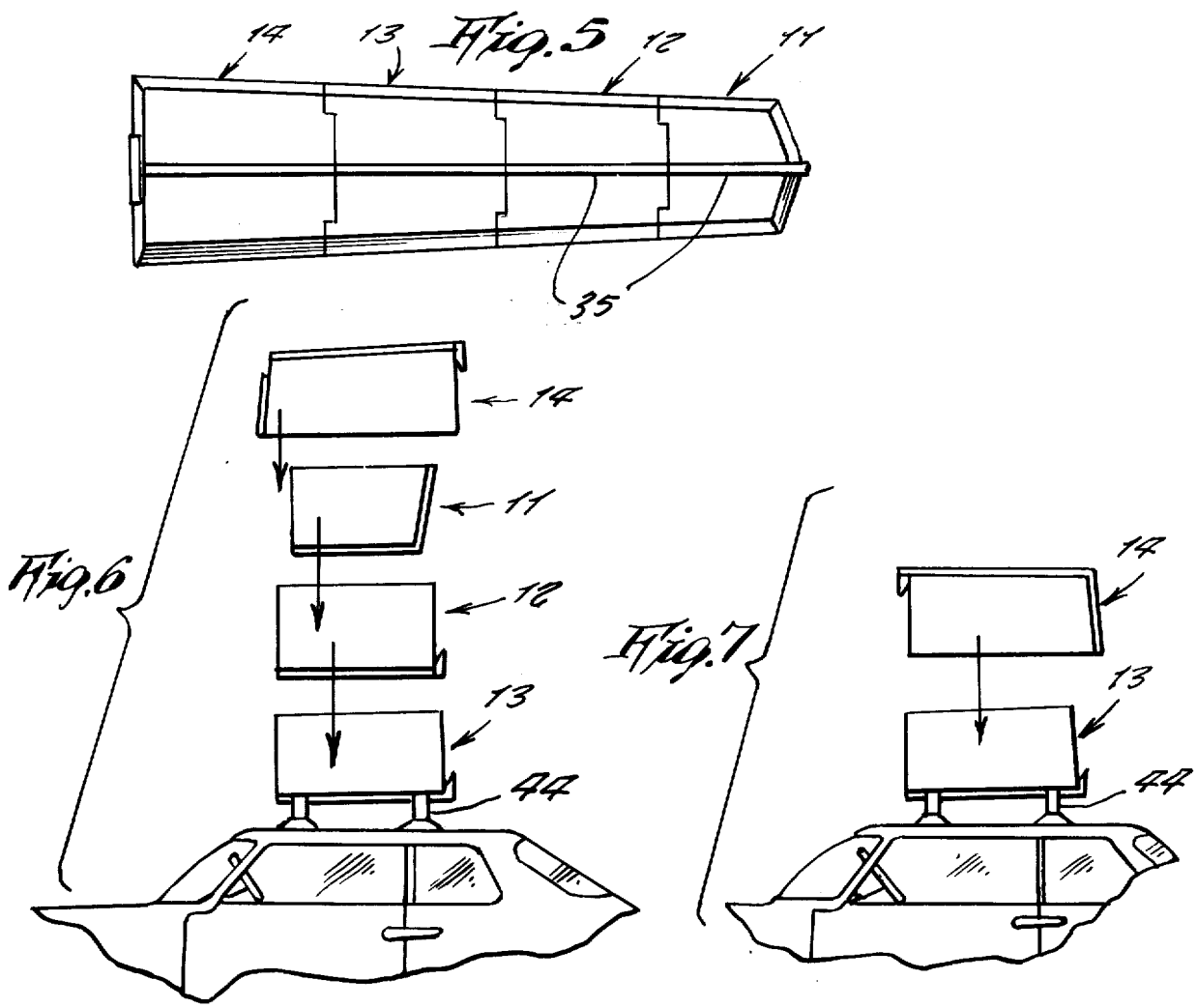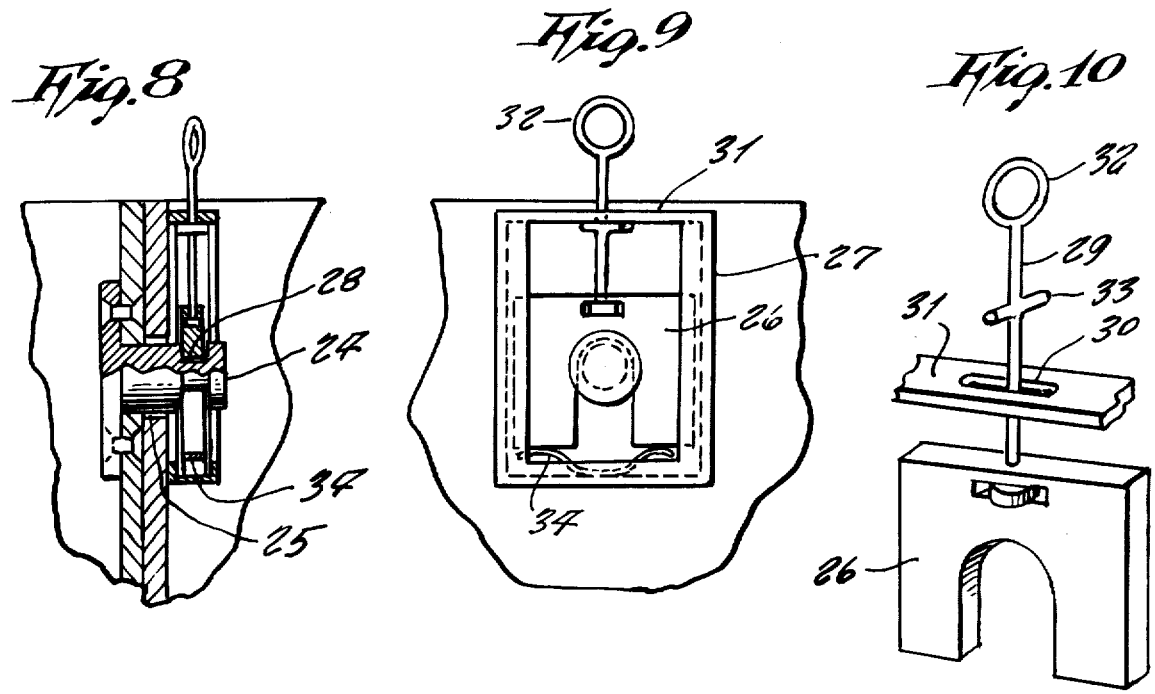

CARTOP TRUNK BOAT

This invention relates generally to small boats that are designed to be readily transportable upon an automobile roof between a person's home and a lake or other body.

It is well known that many such boats are long and cumbersome so are not easy to handle in loading on the car roof rack, so that physical strength is required so to accomplish the same. This situation is accordingly in want of an improvement.

Therefore, it is a principal object of the present invention to provide a boat that is made up of attachable sections that are small and easy to handle that do not require much physical strength and the sections being able to rest inside one another so to form a compact unit on top of the car roof rack that is more secure and easy to tie down on a roof rack than a long, projecting boat.

Another object is to provide a boat which can selectively be made smaller if wished; such as for use by one person alone or for use in winding streams so to more easily maneuver in sharp turns.

Still another object is to provide a boat in which the central sections may be used above, without a stern and bow section, so to serve as a closed luggage carrier on a car roof rack for carrying various objects therewithin.

Still another object is to provide a boat which instead of being necessarily carried on a car top, can readily fit when sections are nested, inside a station wagon, van, pick-up or closed truck, requiring only minimum space.

Still another object is to provide a boat which is more seaworthy, because in case any sections develops a leak, the other sections will keep the boat afloat.

Still a further object is to provide a boat in which the sections may be molded inexpensively of plastic so that each weigh only about 25 pounds so that one person alone can handle the sections, and wherein the center sections may be made of a clear plastic so to see therethrough and down into the water so to observe fish, underwater fauna, and a water bottom.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the assembled boat.

FIG. 2 is a cross-sectional view on line 2—2 of FIG. 1.

FIG. 2a is a fragmentary perspective view of the seat being folded away.

FIG. 3 is a view showing the lower coupling structure.

FIG. 4 is a side view of the assembled boat.

FIG. 5 is a bottom view thereof.

FIG. 6 is an exploded view of the boat being placed on a car roof rack.

FIG. 7 is a similar view using only certain boat sections to form a car roof rack storage box.

FIG. 8 is an enlarged cross-sectional view of line 8—8 of FIG. 1.

FIG. 9 is a side view thereof.

FIG. 10 is a perspective view of a detail thereof.

Referring now to the drawings in detail, the reference numeral 10 represents a cartop trunk boat according to the present invention wherein the same is comprised of bow section 11, a first center section 12, a second center section 13, and a stern section 14, that are detachably securable together. The sections are preferably of molded plastic so to be inexpensively produced and precise in dimensions so to readily interfit or replace.

Each section is of open box-like shape including bottom wall 15, opposite side walls 16 and opposite forward and rearward aft walls 17 and 18 respectively, which in the stern section and bow sections serve as a stern 19 and bow 20. As shown, the upper edges of the walls 17 and 18, with exception of the bow 20, include downward notch 21 so to allow easy movement of a person from one section to another.

The sections are readily securable together by means of a rearwardly projecting wide hook 22 of one section being fitted inside a wide notch 23 of an adjacent section, as clearly illustrated in FIGS. 2 and 3, thus hooking the lower portions of the walls 17 and 18 of adjacent sections firmly together. The upper ends of the walls are then locked together by means of a pair of studs 24 horizontally projecting outwardly of each upper corner of the walls 17 and which are receivable into openings 25 in the upper corners of walls 18 of the adjacent section. The studs project through the openings, as shown in FIG. 8 so that a yoke 26 vertically slidable in a Frame 27 is receivable in an annular groove 28 around a projecting portion of the stud; the yoke thus locking the stud from disengagement. Thus the sections are quickly and easily secured together.

the frame 27 is stationarily secured to an inboard side of wall 18. The yoke 26 comprises an inverted, U-shaped plate slidable within the frame. A pin 29 attached freely pivotably to the yoke extends upwardly out of a slotted opening 30 on the top bar 31 of the frame, and the upper end of the pin has a pull ring 32 rigidly secured thereto for purposes of manually pulling up or pushing down the yoke. A cross arm 33 is integral with a longitudinal intermediate portion of the pin 29 and serves to bear against an underside of the bar 31 when the yoke is pushed downwardly against a leaf spring 34 within a bottom of the frame, and the pull ring is given a ¼ turn so that the cross arm extends transversley under the bar. In order to uncouple the sections, the pull ring is simply given a ¼ turn so that the cross arm aligns with the slotted opening 30. The ring is then pulled upwardly, pulling the cross arm through the slotted opening, the pin thus lifting the yoke upwardly so to free the stud 24 which then can slip out of the opening 25.

Each section has a keel 35 on an underside thereof. The section 13 includes oar locks 36 adjacent its gunwales 37 so to receive oars 38. A fixed seat 39 is in the bow section and another fixed seat 40 is in the stern section. A seat 41 may be provided in each section 12 and 13; the seats 41 being downwardly pivotable so to be folded flat against the wall 17 in a stored position when not needed. Each seat 41 includes legs 42 placable in floor cup 43 when supporting the seat 41 in a horizontal utility positon as shown in FIG. 2; the legs pivoting behind the seat when the seat is folded downward into the stored position.

As shown in FIG. 6, the sections nest one inside the other so to be carried compact upon a car roof rack 44. By using only the sections 13 and 14 a luggage carrier is thus provided on the rack 44 for carrying other freight therewithin, as shown in FIG. 7.

Thus there is provided a cartop trunk boat.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is as follows:

1. A cartop trunk boat, comprising in combination, a plurality of boat sections including a bow section, a forward central section, an aft central section and a stern section, said sections being detachably attachable together to form said boat, said sections when detached, nesting into each other for compact transportation on a car roof rack, wherein each said section comprises an open box made of molded plastic and including a bottom, opposite side walls and an aft and forward wall, wherein said sections are attachable together by means of a hook along a lower portion of said forward walls being receivable in an upward groove formed on an aft wall of an adjacent said section; and upper corners of said aft and forward walls being locked together by a forwardly projecting stud at each said corner of said aft wall removably received through an opening of said forward wall, a projecting end of said stud having an annular groove receiving a vertically slidable yoke in a frame mounted on said forward wall.

2. The combination as set forth in claim 1 wherein a seat in certain said sections is pivotable between a horizontal and vertically downward position by means of a hinge, a leg hinged on an edge of said seat foldable behind said seat, said leg in utility position having a lower end fitted in a cup formed upon said bottom.

* * * * *